United States Patent
Perkins et al.

(10) Patent No.: US 9,027,511 B2
(45) Date of Patent: May 12, 2015

(54) PET GROOMING TOOL

(71) Applicant: Yes Marketing Group, LLC, North Yarmouth, ME (US)

(72) Inventors: Lisa Marie Perkins, North Yarmouth, ME (US); Sheldon Clifford Perkins, North Yarmouth, ME (US)

( * ) Notice: Subject to any disclaimer, the term of this patent is extended or adjusted under 35 U.S.C. 154(b) by 0 days.

(21) Appl. No.: 13/803,047

(22) Filed: Mar. 14, 2013

(65) Prior Publication Data
US 2014/0261224 A1 Sep. 18, 2014

(51) Int. Cl.
*A01K 13/00* (2006.01)

(52) U.S. Cl.
CPC ................................. *A01K 13/002* (2013.01)

(58) Field of Classification Search
CPC ..... A01K 13/00; A01K 13/002; A45D 34/00; A45D 24/02; A45D 24/04
USPC .................. 119/600, 612, 615, 625, 632, 633; 30/30; 132/160, 219, 212; D30/159
See application file for complete search history.

(56) References Cited

U.S. PATENT DOCUMENTS

| | | | | |
|---|---|---|---|---|
| 1,998,661 | A * | 4/1935 | Eberhard | 132/125 |
| 2,431,865 | A * | 12/1947 | Dempsey | 132/123 |
| 2,503,961 | A | 4/1950 | Meunier | |
| 2,529,012 | A * | 11/1950 | Gleekman | 119/632 |
| 2,596,296 | A * | 5/1952 | Shields | 132/160 |
| D205,995 | S * | 10/1966 | Montecalvo | D30/159 |
| 3,302,654 | A * | 2/1967 | Scamman | 132/122 |
| 3,491,725 | A * | 1/1970 | Maniscalco | 119/625 |
| 4,026,307 | A * | 5/1977 | Morrow | 132/148 |
| 4,970,990 | A | 11/1990 | Wilhelmi | |
| 4,996,996 | A * | 3/1991 | Hirsh | 132/160 |
| 5,694,953 | A * | 12/1997 | Stephan et al. | 132/160 |
| 6,199,513 | B1 | 3/2001 | Nichols | |
| 6,367,422 | B1 | 4/2002 | Wilhelmi | |
| 6,497,045 | B1 * | 12/2002 | Forgani | 30/305 |
| 6,782,846 | B1 | 8/2004 | Porter et al. | |
| 6,955,137 | B2 * | 10/2005 | Dunn et al. | 119/625 |
| 7,077,076 | B2 | 7/2006 | Porter et al. | |
| 7,159,274 | B2 | 1/2007 | Freidell | |
| 7,222,588 | B2 | 5/2007 | Porter et al. | |
| 7,334,540 | B2 | 2/2008 | Porter et al. | |
| D565,258 | S | 3/2008 | Porter et al. | |
| 7,509,926 | B2 | 3/2009 | Porter et al. | |
| 7,650,857 | B2 | 1/2010 | Porter et al. | |
| 7,650,858 | B2 | 1/2010 | Porter et al. | |
| 7,717,067 | B2 | 5/2010 | Porter et al. | |
| 7,748,350 | B2 * | 7/2010 | Vandervoet | 119/618 |
| D626,295 | S | 10/2010 | Porter | |
| D626,296 | S | 10/2010 | Porter | |
| D626,297 | S | 10/2010 | Porter | |
| 8,011,059 | B2 | 9/2011 | Porter et al. | |

(Continued)

*Primary Examiner* — Monica Williams
*Assistant Examiner* — Michael Wang
(74) *Attorney, Agent, or Firm* — Guerry L. Grune; ePatentManager.com

(57) ABSTRACT

A pet grooming tool including a handle and long tines terminating in short, shallow catchment hooks. When the tines are drawn through the pet's fur, the catchment hooks untie tangled and matted fur incrementally without snagging and compounding the whole mass and without cutting through or removing attached fur. The hooks include a blunt leading edge that grabs and unties fur entanglements without cutting the fur. The long tines deliver the catchment hooks to the under coat while leaving the guard coat alone. The handle is ergonomic with a contoured shape for ease of use, effective engagement of the tines with the fur and a pleasing grooming experience for the pet owner and the pet.

8 Claims, 4 Drawing Sheets

(56) References Cited

U.S. PATENT DOCUMENTS

| | | |
|---|---|---|
| 8,100,089 B1 * | 1/2012 | Francoeur .................... 119/629 |
| 8,230,819 B2 | 7/2012 | Freidell |
| D672,923 S | 12/2012 | Loudenback et al. |
| D672,924 S | 12/2012 | Amice et al. |
| 2012/0055416 A1 * | 3/2012 | Forgues ........................ 119/633 |
| 2014/0026821 A1 * | 1/2014 | Tu, Hua ........................ 119/600 |
| 2014/0158151 A1 * | 6/2014 | Sebagereka et al. ....... 132/213.1 |

\* cited by examiner

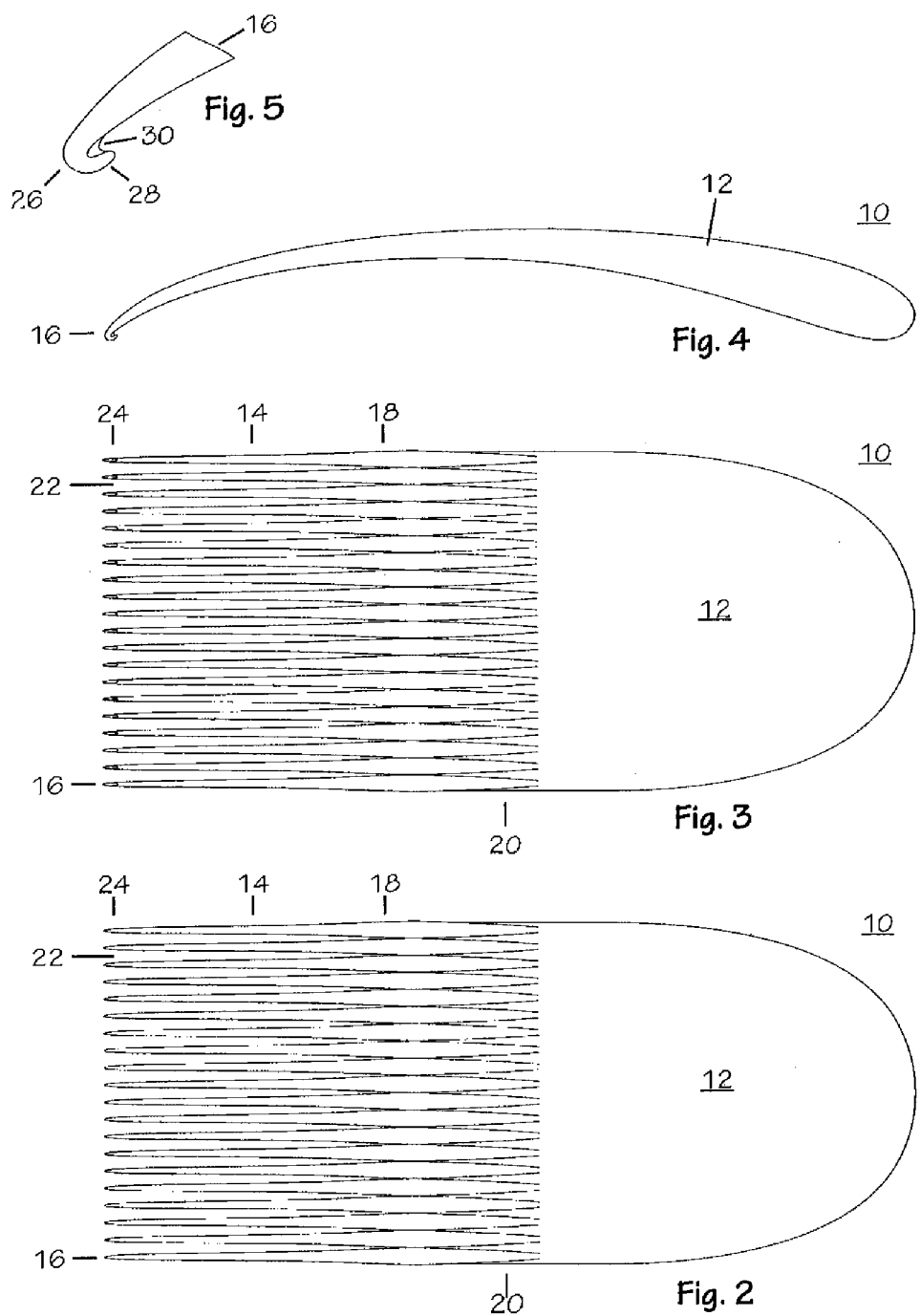

PET GROOMING TOOL

BACKGROUND OF INVENTION

1. Field of the Invention

The present invention relates to pet grooming tools. More particularly, the present invention relates to brushes and combs that are designed to straighten tangled pet fur or hair and to remove mats. The tool is effective in grooming pets with double coats.

2. Description of the Prior Art

There are many products used to groom pets including, primarily, dogs and cats. One significant focus of these products is the care of pet hair or fur. There are brushes, combs and rakes, for example, that are designed to smooth and untangle hair/fur and/or to remove mats. A mat is a mass of hair/fur that is twisted or stuck together. That mass includes loose fur or hair twisted together with attached fur or hair. Mats can cause skin problems when close to the skin and left untreated. It can be painful to the pet to remove a mat. Cats and dogs with a double coat are particularly susceptible to matting and therefore most in need of a suitable grooming tool. It is noted that the double coat of an animal is formed of an outer hair layer, or "guard coat" and an underlying fur layer or "under coat".

Existing solutions for tending to mats and other sorts of hair/fur entanglements utilize either tightly grouped arrays of short bristles or tines to rake the coat uniformly to remove primarily loosened guard coat hair. Other such solutions are combs or brushes including long simple columnar tines arranged in a row or matrix that reach the underlying under coat. However, the long tines can get caught in the mats, causing discomfort or injury to the animal as the tines are dragged through the coat. That discomfort or injury may be caused by either or both of: a) the sharp ends of the tines scraping the skin; and b) dragging both loose and attached fur wherein the attached fur may be pulled out of the skin. Other such solutions are combs or brushes including arrays of arcuate blades with a sharpened leading edge designed to cut apart matted fur. Because matted fur is entangled with healthy attached fur, these devices indiscriminately cut healthy attached fur along with loose matted fur. They also remove both guard coat and under coat, although it is desirable to remove primarily under coat fur that is loosened and/or entangled, rather than both the under coat and the guard coat.

Another limitation associated with using existing grooming tools that include tines functioning as cutting blades is that they cut and remove healthy fur while also removing mat. There are two types of grooming tools in this category. One type is similar to a barber's thinning razor. Another type employs arrays of blade-like tines with a sharpened leading edge designed to cut apart matted fur. While these may be effective at mat removal, it is often undesirable to remove healthy, attached fur with the mat. Moreover, the groomer must be particularly cautious with these tools as they are sharp enough to injure the groomer or the pet if not used very carefully. These and other tools intended to remove mats can be expensive without being sufficiently effective at the task and they can cause pain or injury for all involved.

What is needed is a pet grooming tool that is effective at untangling fine-textured pet hair/fur including the removal of mats by mainly leaving attached fur in place and removing loose fur/hair. What is needed is such a tool that is configured to accomplish that functionality while minimizing the potential for harm to the pet and the groomer. Further, what is needed is such a tool that is easy to use and reasonably priced.

SUMMARY OF THE INVENTION

It is an object of the present invention to provide a pet grooming tool that is effective at untangling pet hair/fur including the removal of mats with minimal impact on attached fur/hair. It is also an object of the present invention to provide such a tool that is configured to accomplish that functionality while minimizing the potential for harm to the pet and the groomer. The present tool is arranged to get to mats and fine-textured loosened fur in the under coat and minimize the impact on the guard coat. The tool of the invention is simple to use, includes a handle that is ergonomically well suited for the task and can be made for reasonable pricing.

These and other objects are achieved with the pet grooming tool of the present invention. The tool includes a handle with a contoured shape to enhance the grooming experience joined to an array of very short and shallow catchment hooks mounted on long tines arranged to reach to the base of pet fur/hair to untangle and extract tangled and/or matted fur/hair without cutting or pulling intact, untangled fur/hair. The catchment hooks are blunt tipped to prevent scratching the animal's skin and blunt on the inside or leading edge of the hook so as not to cut hair/fur. The primary configuration has one catchment hook at the end of each tine. An alternate configuration has multi-hook tines that are arced to sequentially pick away at mats and tangles while maintaining an angle of each catchment hook to prevent scratching the animal's skin.

The short and shallow catchment hooks on the long tines untie tangles and mats incrementally, from the top down rather than cutting or yanking the whole mat or tangle at once from the bottom up. This design accomplishes fur disentanglement without snagging and compounding the whole mass of hair/fur. The blunt leading inside edge of the catchment hooks allow the groomer to grab and untie mats without cutting loose and attached fur. Further, the long tines deliver the catchment hooks to the fine-textured undercoat while leaving the coarser guard coat alone.

The grooming tool of the present invention is effective for removing mats with minimal removal of attached and healthy fur and with minimal chance of harming the pet or the groomer. These and other features and advantages of the present invention will be understood upon review of the following detailed description, the accompanying drawings and the appended claims.

BRIEF DESCRIPTION OF THE DRAWINGS

FIG. 2 is a top plan view of the grooming tool of the present invention.

FIG. 3 is a bottom plan view of the grooming tool of the present invention.

FIG. 4 is a side view of the grooming tool of the present invention.

FIG. 5 is a close-up side view of a tine of the grooming tool of the present invention showing the catchment at the terminus of the hook.

DETAILED DESCRIPTION OF THE INVENTION

Figure 1:
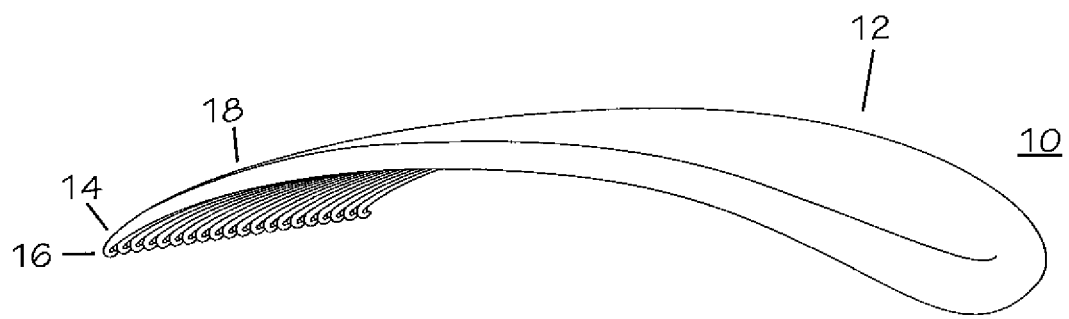
FIG. 1 is a rear perspective view of the grooming tool of the present invention.

A grooming tool 10 of the present invention is shown in FIGS. 1-5. The tool 10 includes a handle 12, an array of tines 14 and an array of catchment hooks 16. The tines 14 extend from the handle 12 and terminate with the catchment hooks 16. The handle 12 has a contoured shape for ergonomic suitability and enhanced engagement of the tines 14 and catchment hooks 16 with an animal's tangles and mats. The handle 12 is thicker away from the tines 14 as part of the ergonomic design. Its sleek, graceful contour is designed to enhance the grooming experience. The handle 12, rather than being solely ergonomic for an efficient grip to facilitate grooming, is designed as an extension of the hand and fingers and celebrates the sense of touch through stroking that bonds owners to their pets. The promise of a comforting tactile experience draws people to touch their pets, and the tool 10 is designed to enhance that experience. Further, the handle 12 may have a textured surface to enhance gripping. The handle may be fabricated of metallic material, such as stainless steel, or one or more nonmetallic materials including, but not limited to, composite materials.

The tines 14 are about five to ten centimeters in length and the number of tines 14 is selectable and dependent on the width of the handle 12. The tines 14 include a tines transition portion 18 that is connected to or an integral part of the handle 12 at handle transition region 20. The tines are spaced approximately one millimeter apart at the tines transition portion 18. The tines 14 narrow from the tines transition portion 18 to the catchment hooks 16 wherein space 22 between the tines 14 at hook transition region 24 is about three to five millimeters. The tines 14 and associated catchment hooks 16 are aligned with the orientation of the handle 12 as shown in the drawing.

The narrowing of the tines 14 from the tines transition portion 18 to the hook transition region 24 results in a corresponding expansion of the spacing between adjacent tines 14 from the catchment hooks 16 to the tines transition portion 18. That arrangement increases the ability to get through the guard coat to the under coat and engage tangles and mats near the animal's skin. The tines 14 may be fabricated of a metal, such as stainless steel, or other materials including, but not limited to, nonmetallic materials such as composites, suitable for carrying out the grooming function. The tines 14 may be made of the same material or a different material as is used to make the handle 12.

As shown in FIG. 5, the catchment hooks 16 at the ends of the tines 14 include a curved portion 26 and a tapered blunt-ended terminal 28. The catchment hooks 16 extend downwardly from the ends of the tines perpendicular to a plane along which the plurality of tines exist and inwardly back toward the handle 12 as shown in the drawings. The curved portion 26 is relatively short in comparison to the length of the tines 14 and shallow in depth. If they are too long and/or deep, it becomes more possible to grab and pull attached fur entangled with mats or too great a scale to engage with very fine undercoat fur. The catchment hooks 16 are approximately two millimeters high by three millimeters long by two millimeters wide. If the catchment hooks are much longer than three millimeters long, or deeper than two millimeters high, they may not effectively engage the fine-textured loose undercoat hair/fur or may too aggressively engage with matted fur, thereby potentially harming the animal by tugging at its skin. The catchment hooks 16 are spaced about three to five millimeters apart. The curved portion 26 of the catchment hook 16 may contact the animal's skin during a grooming activity. The curved portion 26 is not sharp and does not act as a blade. It therefore cannot cause harm by making contact with the skin. The tapered, blunt-ended terminal 28, which is spaced away from the skin when the tool 10 is in use, is configured to engage with the under coat and allow for the incremental hooking of tangled and matted fur layer by layer. Interior leading edge 30 of the catchment hook 16 is blunt in order to hook tangled and matted fur without cutting healthy attached fur or pulling at the animal's skin by pulling that fur.

The handle 12, tines 14 and catchment hooks 16 may be formed as a unitary structure. The contoured shape of the handle 12 allows for ergonomic alignment of the tines 14 to effectively catch loose under coat, with a shallow enough angle relative to the plane of the animal's skin to prevent scratching. The handle 12 has an ergonomic contoured shape to provide ease and comfort of holding. The tines 14 extend from the handle 12 in alignment with that contoured shape. That alignment provides for effective grooming without causing harm. Specifically, when the handle 12 is located in a user's hand and the tines 14 are engaged with an animal's fur or hair, a natural pulling motion of the hand causes the tines 14 to engage with the animal's fur/hair. The force provided in that action is sufficient to cause engagement with tangles and mats in the incremental manner noted with respect to the configuration of the catchment hooks 16. Because of the shape of the catchment hooks 16, the animal's skin will not be scratched regardless of how the tool 10 is held.

Figure 6:
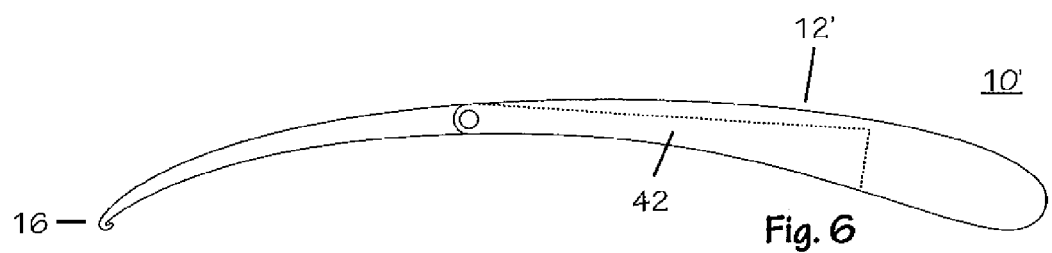
FIG. 6 is a side view of a second embodiment of the grooming tool of the present invention.
Figure 7:
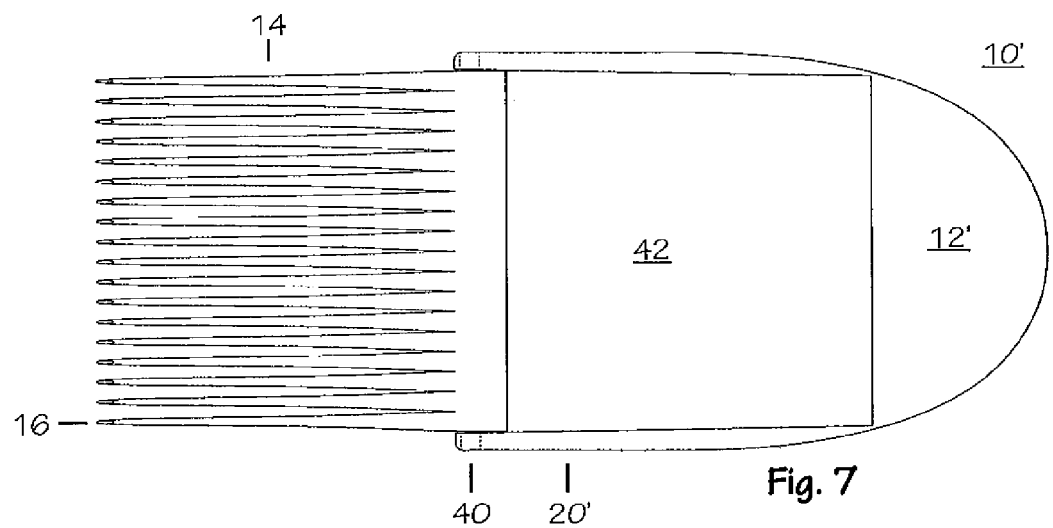
FIG. 7 is a plan view of the second embodiment of the grooming tool of the present invention showing the tines extended.
Figure 8:
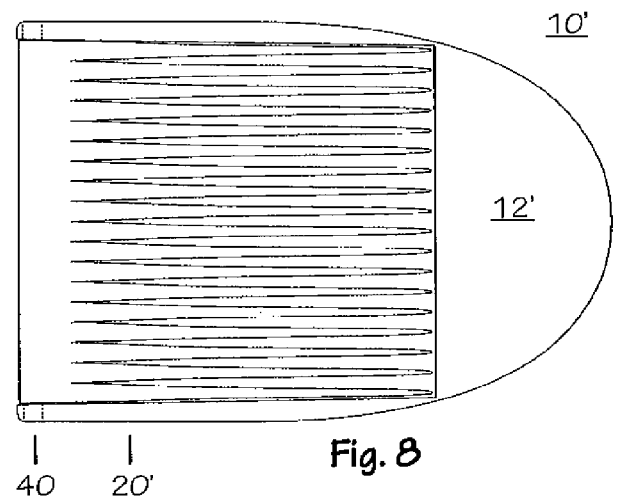
FIG. 8 is a plan view of the second embodiment of the grooming tool of the present invention showing the tines retracted.

An alternate embodiment of the tool 10' is shown in FIGS. 6-8. The tool 10' includes a contoured handle 12' with a handle transition region 20' including a hinge 40 that allows the array of tines 14 to be folded or retracted for storage into the handle 12' or, optionally, the tines 14 may be folded into a cavity 42 of the handle 12'. The handle 12' includes a cavity 42 within which retracted tines 14 are retained. That alternative embodiment allows for more compact storage and prevents the tool from becoming snagged on clothing and other surfaces when the tool is not in use.

Figure 9:
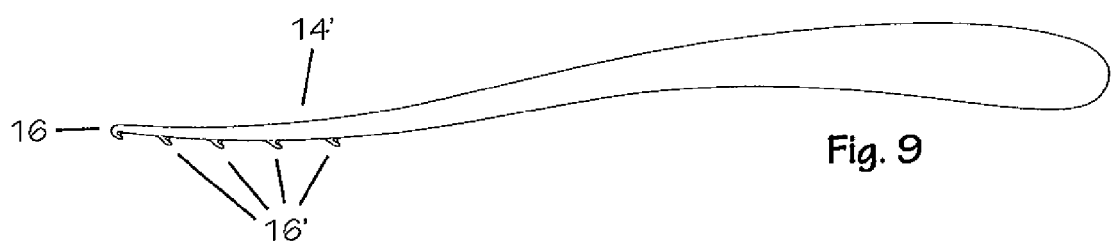
FIG. 9 is a side view of a second embodiment of the tines of the present invention.

An alternate embodiment of a tine 14' is shown in FIG. 9. The tine 14' has the catchment hooks 16 at the terminus thereof. The tine 14' further includes a plurality of catchment hooks 16' spaced along all or a portion of the tine 14'. That alternative configuration of the tine 14' allows for simultaneous disentanglement or mat removal through several layers of the hair/fur of the animal with a single movement of the tool through the hair or fur.

It is to be understood that various modifications may be made to the tool 10 and the components described herein without departing from the spirit and scope of the invention. Accordingly, other embodiments are within the scope of the claims appended hereto.

What is claimed is:

1. A tool for grooming an animal, the tool comprising:
   a. a handle of contoured shape, the handle having an orientation;
   b. a plurality of tines extending from the handle, wherein the tines are aligned with the orientation of the handle; and
   c. the plurality of tines comprising at least two catchment hooks per tine, wherein each catchment hook is located along the length of a corresponding tine, wherein the catchment hooks are aligned in the same longitudinal orientation as their respective tines and are curved perpendicular to a plane along which the plurality of tines exist and inwardly back toward the handle, and wherein each of the catchment hooks is blunt tipped and includes a blunt concave inside leading edge of the catchment hooks, maintaining an ability to untangle and extract tangled and/or matted fur without cutting.

2. The tool of claim 1, wherein the catchment hooks curve upwardly or downwardly, perpendicular to a plane along which the plurality of tines exist.

3. The tool of claim 1, wherein the tines are long enough to position the catchment hooks in an under coat of the animal while leaving alone a guard coat thereof.

4. The tool of claim 1, wherein the catchment hooks include a curved portion and a tapered, blunt-ended terminal and wherein a length of the catchment hooks is substantially less than the length of the tines and sufficiently shallow as to engage a limited depth of tangled and matted fur.

5. The tool of claim 1, wherein the handle, tines, and catchment hooks comprise a unitary structure.

6. The tool of claim 1, wherein the handle is of an ergonomic shape which ensures that a user engages with the animal's skin only with the blunt-ended terminal of the catchment hooks.

7. The tool of claim 1, wherein the tines are retractable.

8. The tool of claim 1, wherein the tines are made of stainless steel.

\* \* \* \* \*